May 27, 1941.　　B. J. FESTERVAN ET AL　　2,243,419
FISHING TOOL
Filed Oct. 19, 1938
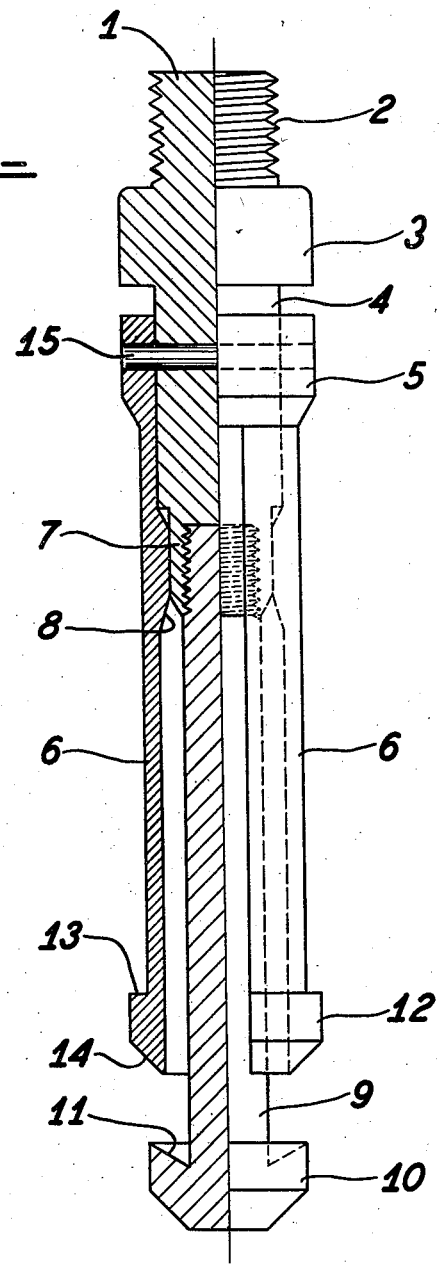
FIG_1_
Benjamin J. Festervan INVENTOR.
BY Nathan F. Henderson
P. L. Young ATTORNEY.

Patented May 27, 1941

2,243,419

UNITED STATES PATENT OFFICE 2,243,419

FISHING TOOL

Benjamin J. Festervan and Nathan F. Henderson, Monroe City, Tex.

Application October 19, 1938, Serial No. 235,794

7 Claims. (Cl. 294—93)

The present invention is directed to a fishing tool for use in the recovery of implements from a bore hole.

The customary fishing tool heretofore used in the recovery of implements from bore holes is provided with spring fingers which are adapted to engage especially designed protuberances on the instruments to be recovered. These fishing tools have the disadvantage that, in order to operate, the fingers must fit into the annular space between the protuberance and the wall of the bore hole which space is frequently blocked or distorted in such a way as to render engagement impossible. The principal object of the present invention is the provision of a fishing tool which will coact with a recess in the instrument to be recovered.

A further object of the present invention is the provision of a fishing tool of the character described provided with means which make possible the recovery of the fishing tool in the event that the instrument being fished for is too tightly wedged to be removed.

Further objects and advantages of the present invention will appear from the following detailed description of the accompanying drawing in which the single figure is a side view, partly in section, of a fishing tool according to the present invention.

Referring to the drawing in detail, numeral 1 designates a barrel which, from one end to the other, has, in sequence, a threaded portion 2 adapted to be engaged with tubing or with a suitable socket on a wire line, a portion 3 of enlarged diameter adapted to act as a stop, a portion 4 of smaller diameter upon which is adapted to ride a ring 5 carrying the spring arms 6 of the fishing device, a portion 7 of still smaller diameter adapted to provide a bearing surface for cam-like surfaces 8 provided on the inside faces of spring arms 6, a portion 9 of still further reduced diameter, and an integral collar 10 having its inner face cut away to form a bevelled seat 11. Each spring arm carries at its free end an enlarged collar member 12 having a shoulder 13 and having a bevelled forward end 14. The collar 5 is fixed in place on section 4 of the barrel by a shear pin 15.

The cam-like portions 8 on the spring arms 6 keep the forward ends of these arms spaced from section 9 of the barrel and, therefore, permit the inward bending of these arms. With the parts in the position shown, the fishing tool is lowered into the bore hole until the collar 10 rests inside the recess of the implement to be recovered, implements provided with such recesses being shown in our copending applications Ser. Nos. 235,795 and 236,862. It will be understood that the recess in the implement will be of sufficient depth to receive both collar 10 and collar members 12 in the position in which they are shown in the drawing. When the bevelled portions 14 abut against the mouth of the recess of the implement to be recovered, further pressure on the barrel 1 causes the collars 12 to be pressed together sufficiently to enter the mouth of the recess. Upon passing through the mouth of the recess the collars 12 spring outwardly again, permitting shoulders 13 to engage seats provided in the recess for that purpose. The implement can then be withdrawn.

In the event that the implement is too tightly stuck to be removed, the shear pin 15 will be sheared before sufficient force is applied to injure any of the equipment. Upon the shearing of this pin, collar 5 slides downwardly over section 4 of the barrel, as do cam surfaces 8 over section 7. When the cam surfaces reach section 9 of smaller diameter, the spring arms collapse causing collar members 12 to come together sufficiently to enable their withdrawal from the mouth of the recess in the stuck implement. Collar 10 is provided to receive the bevelled ends of collars 12 in this event so that the spring arms will not be lost.

It is apparent that changes can be made in the size, shape and arrangement of parts without departing from the principle upon which the present invention is based. Such changes are contemplated within the scope of the appended claims in which it is intended to claim the present invention as broadly as the prior art permits.

We claim:

1. A fishing tool comprising a barrel, spring arms mounted upon the outside surface of said barrel, a shear pin attached to said barrel adapted to prevent longitudinal movement between said arms and said barrel, outwardly projecting shoulders arranged adjacent the free ends of said arms, said free ends being inwardly tapered, and means for holding said spring arms spaced radially outwardly from said barrel.

2. A fishing tool comprising a barrel having adjacent sections of different diameters, spring arms mounted on said barrel and extending over said adjacent sections with their free ends over the section of smaller diameter, outwardly projecting shoulders arranged adjacent the free ends of said arms, said free ends being inwardly tapered, and protuberances provided on the inner faces of said arms in a position to abut against the section of larger diameter.

3. A fishing tool comprising a barrel, a collar arranged on said barrel, a shear pin securing said collar to said barrel, spring arms carried by said collar and arranged substantially parallel with said barrel, outwardly projecting shoulders arranged adjacent the free ends of said arms, said free ends being inwardly tapered, and means intermediate the ends of said free arms for spacing said arms from said barrel.

4. A fishing tool comprising a barrel, a collar mounted on said barrel, a shear pin connecting said collar to said barrel, spring arms carried by said collar and arranged substantially parallel with said barrel, outwardly projecting shoulders arranged adjacent the free ends of said arms, said free ends being inwardly tapered, means for holding said free arms spaced from said barrel, means for causing said arms to collapse on said barrel when said shear pin is sheared, and a stop carried by said barrel for retaining said arms on said barrel when said pin is sheared.

5. A fishing tool comprising a barrel, a threaded nipple on one end of said barrel, a laterally projecting stop fixed to the other end of said barrel, adjacent sections of said barrel near said latter end being of different diameter, a collar mounted on said barrel between said sections and said threaded nipple, spring arms carried by said collar and arranged to overlay said adjacent sections with their free ends over the section of smaller diameter, outwardly projecting shoulders arranged adjacent the free ends of said arms, said free ends being inwardly tapered, cam surfaces carried by said arms in a position to coact with the section of larger diameter of said barrel so as to hold the free ends of said arms spaced from the section of said barrel of smaller diameter, and a shear pin connecting said collar to said barrel.

6. A fishing tool comprising a barrel having adjacent sections of different diameters, spring arms mounted on said barrel and extending over said adjacent sections with their free ends over the sections of smaller diameter, a shear pin attached to said barrel adapted to prevent longitudinal movement between said arms and said barrel, outwardly projecting shoulders arranged adjacent the free ends of said arms, said free ends being inwardly tapered, and protuberances provided on the inner faces of said arms in a position to abut against the section of larger diameter.

7. A fishing tool comprising a barrel, spring arms biased radially inwardly mounted upon the outside surface of said barrel, a shear pin attached to said barrel adapted to prevent longitudinal movement between said arms and said barrel, outwardly projecting shoulders arranged adjacent the free ends of said arms, said free ends being inwardly tapered, and means for holding said spring arms spaced radially outwardly away from said barrel.

NATHAN F. HENDERSON.
BENJAMIN J. FESTERVAN.